May 12, 1964 H. F. RAYFIELD 3,132,787

MAGNETIC TAPE DRIVE MECHANISM

Filed March 18, 1963

INVENTOR.
HARRY F. RAYFIELD

BY Christie, Parker & Hale
ATTORNEYS.

3,132,787
MAGNETIC TAPE DRIVE MECHANISM
Harry F. Rayfield, Arcadia, Calif., assignor to Burroughs Corporation, Detroit, Mich., a corporation of Michigan
Filed Mar. 18, 1963, Ser. No. 265,948
5 Claims. (Cl. 226—176)

Figure 2:
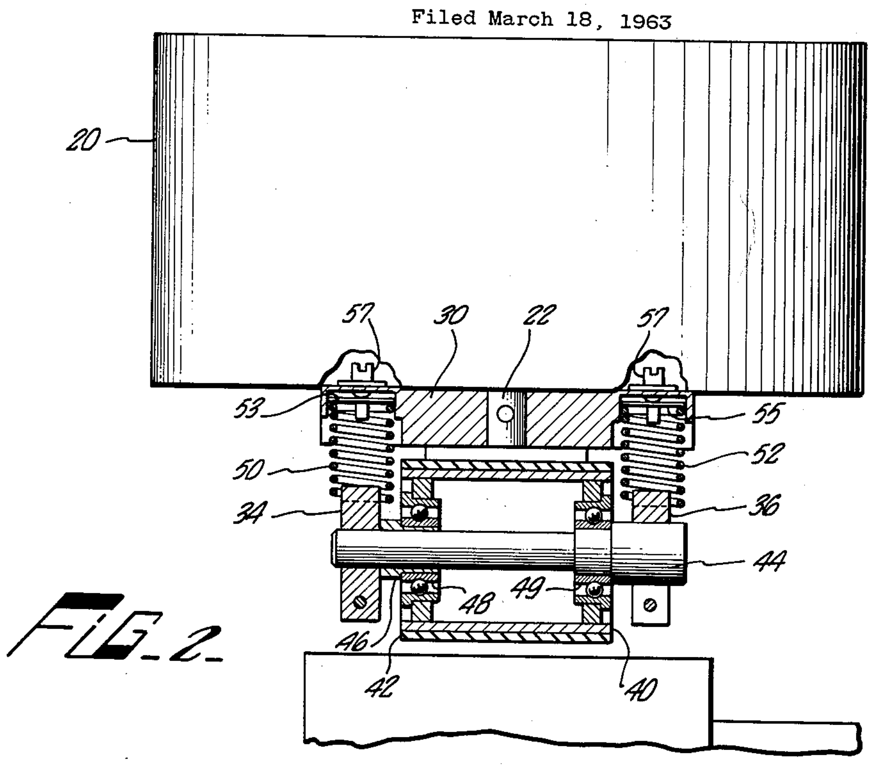

The present invention relates to a drive mechanism for magnetic tape, and more particularly is concerned with apparatus for providing rapid starting and stopping of the tape motion.

Magnetic tape is used extensively in digital processing systems for storage of large quantities of digital information. To achieve high density recording, the magnetic tape speeds are frequently well over a hundred inches per second. Normally information is read off the magnetic tape only as called for by the associated processing system. This means that when information is called for by the data processing system, the magnetic tape must be rapidly accelerated up to its full speed before the information can be read out of the tape.

In order to permit the magnetic tape to be stopped and restarted between successive read out operations, a space is left between adjacent blocks of information on the tape. Since these interblock spaces are wasted as far as storage of information is concerned, it is desirable to keep these interblock spaces as short as possible.

It has been common practice to use a rotating capstan and a pinch roller for frictionally engaging the tape with the capstan to accelerate the tape up to and maintain it at the proper speed. To provide high acceleration, the magnetic tape is isolated from the reels by suitable buffering such as vacuum columns. Thus when the capstan engages the tape, a relatively small amount of tape is initially accelerated up to the operating speed, thus greatly limiting the mass which must be accelerated.

In the past, the pinch roller has been operated in two ways. Either the pinch roller was a freely rotating roller which was accelerated up to speed when it pressed the tape against the capstan, or the pinch roller was caused to rotate at the same speed as the capstan whether or not it was engaging the tape with the capstan. Both of these arrangements have presented problems. With the freely rotating pinch roller, the pinch roller might be stationary when engaging the tape with the capstan, or it might still be spinning due to previous engagement with the capstan. Thus the rate of acceleration of the tape could vary over a considerable range depending upon how frequently the tape was being started and stopped. The interblock space had to be designed to accommodate the slowest rate of acceleration which the system might have. If the tape were accelerated too rapidly due to the spinning of the capstan, the information might be read off the tape before the computer was ready to receive it. At the other extreme, the tape might not be up to speed at the time the information was started to be read out of the magnetic tape.

By continuously rotating the pinch roller at the same speed as the capstan, the acceleration time can be made substantially constant regardless of the frequency with which the magnetic tape is started and stopped. However, the initial acceleration is so fast when the pinch roller engages the tape with the capstan that the tape is started up to speed with a decided jerk. Because the tape is a slightly elastic medium and the magnetic head is necessarily spaced at a small distance from the capstan drive, the jerking of the tape causes the tape to stretch and to flap in the space between the head and the capstan drive. As a result, a transient condition exists in which the speed of the tape as it passes over the magnetic head varies rapidly until the transient dies out and the tape settles down to a constant drive speed. Thus, although the acceleration of the tape is much higher, the total time required before the tape settles down to constant speed, may still be excessive in terms of the interblock spacing required.

The present invention is directed to an improved capstan and pinch roller drive which yields a very smooth yet high rate of acceleration of the tape. At the same time, the drive arrangement of the present invention ensures that the time required to bring the tape up to full speed is substantially constant regardless of the frequency with which the tape is started and stopped. This is accomplished by a drive arrangement in which the pinch roller is positively and quickly brought to a complete stop whenever the pinch roller is disengaged from the capstan. Thus the pinch roller is accelerated up to full speed every time the pinch roller engages the capstan. The pinch roller is made with an elastomer outer surface such as polyurethane or rubber which grips the tape causing the tape to cling to the pinch roller and follow the pinch roller up to speed. Since the pinch roller must be stopped very quickly, effective braking of the pinch roller is provided.

In brief, the present invention involves a capstan drive for magnetic tape in which a rotatable capstan having a smooth cylindrical drive surface is rotated at constant speed. A pinch roller having a cylindrical drive surface of an elastomer material is rotatably supported from a mounting bracket by linkage arms which permit relative movement between the pinch roller and the mounting bracket. Springs extending between the mounting bracket and the pinch roller normally urge the pinch roller toward the capstan relative to the mounting bracket. The mounting bracket includes a brake member which engages the pinch roller to prevent it from rotation, the pinch roller being forced against the brake portion of the mounting bracket by the springs. A solenoid actuator associated with the mounting bracket, moves the mounting bracket and associated pinch roller towards the capstan to engage the pinch roller with the capstan. When the force of the actuator drives the pinch roller down into contact with the capstan, sufficient overtravel is provided on the mounting bracket to cause the pinch roller to engage the capstan and lift off the brake portion against the force of the springs. In this manner, when the actuator is released, the pinch roller is automatically pressed against the brake member by the springs.

Figure 1:
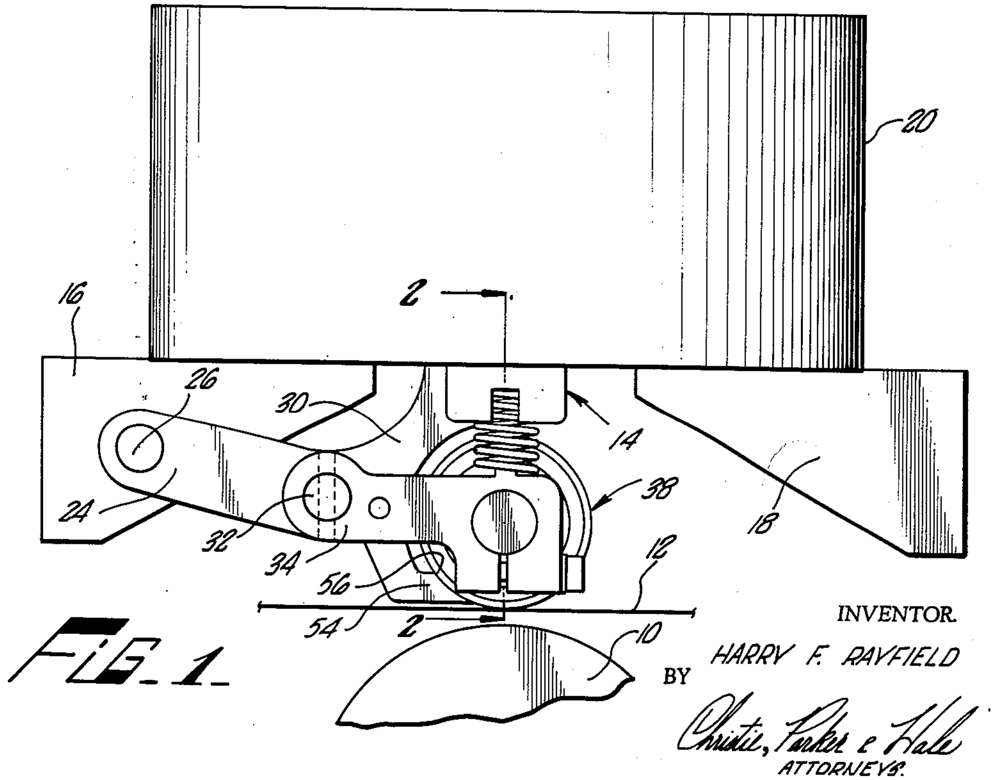

For a more complete understanding of the invention, reference should be made to the accompanying drawing, wherein:

FIGURE 1 is a front elevational view partly in section of the preferred embodiment of the present invention; and FIGURE 2 is a sectional view taken substantially on the line 2—2 of FIGURE 1.

Referring to the drawing in detail, the numeral 10 indicates generally a portion of a rotating capstan made of a smooth hard material such as a suitable metal. The capstan is cylindrical in shape and is rotated at constant angular velocity by a suitable drive motor (not shown). Magnetic tape 12 passes over the cylindrical surface of the capstan and is normally arranged to be out of contact with the capstan but may very lightly engage the surface of the capstan.

A pinch roller assembly, indicated generally at 14, is provided for pressing the tape 12 against the surface of the capstan 10 with sufficient normal force to cause the tape to be accelerated up to the surface speed of the capstan through frictional engagement of the capstan and the tape. The pinch roller assembly 14 is supported from suitable frame members 16 and 18 which are part of the main frame of the associated tape transport. The frame members 16 and 18 support a solenoid actuator 20, which is preferably constructed in a manner described in detail in the copending application Serial No. 208,371, filed July 9, 1962, in the name of Robert G. Nordman and Harry F. Rayfield, and assigned to the assignee of the present invention. The solenoid actuator 20 includes a plunger 22.

The pinch roller assembly 14 is secured to and supported by the plunger 22 and is movable therewith when the actuator solenoid is energized. The pinch roller assembly includes a pinch roller block member 30 which is rigidly secured to the lower end of the plunger 22. The block member 30 is movably supported from the frame member 16 by integral arms 24 and a hinge pin 26 passing through the arms and journalled in the block member 30. A shaft 32 is journalled in the block 30 and a pair of arms 34 and 36 are rigidly secured to opposite ends of the shaft 32. Thus the arms 34 and 36 are rotatable together about the axis of the shaft 32.

A pinch roller 38 is in the form of a cylindrical drum member 40 covered by a sleeve 42 made of pliable rubber or other elastomer material. The pinch roller is made wider than the magnetic tape so that it extends beyond the margins of the tape. The pinch roller is rotatably supported from a shaft 44 which is securely held at opposite ends in openings in the arms 34 and 36. Ball bearings 48 and 49 on the shaft are presssed into the ends of the pinch roller.

The pinch roller 38 is urged toward the capstan by a pair of compression springs 50 and 52. At their lower ends, the springs 50 and 52 engage the arms 34 and 36 respectively. At their upper ends, the springs engage washers 53 and 55 respectively. Set screws 57 are threaded through a portion of the block 30 and bear against the washers. The springs urge the pinch roller into contact with a stripper bar 54 which is formed as an integral part of the block 30. The stripper bar 54 is provided with a concave cylindrical braking surface 56 which fits the outer surface of the rubber sleeve 42 of the pinch roller 38. The springs 50 and 52 normally urge the pinch roller into braking contact with the surface 56.

In operation, when the actuator 20 is energized, the plunger 22 forces the block 30 in the direction of the capstan 10. The smooth surface of the capstan 10 is thus brought in contact with the magnetic tape 12. Because the magnetic tape 12 is only a few thousandths of an inch in thickness and because the pinch roller 38 is greater in width than the tape 12, the margins of the pinch roller 38 are also brought into direct contact with the capstan 10. The actuator 20 produces sufficient overtravel of the mounting bracket 30 to permit the pinch roller to engage the capstan and then lift off the braking surface 56 by compression of the springs 50 and 52. The pinch roller is thus free to rotate and because of the contact with the capstan 10 is quickly accelerated up to the same angular velocity as the capstan 10. The oxide coating of the magnetic tape 12 in contact with the yieldable rubber surface of the pinch roller 38 causes the tape to cling to the pinch roller and to be accelerated by the pinch roller. In following the pinch roller up to speed, a smooth acceleration is imparted to the tape, eliminating jerking of the tape and attendant stretching and flapping of the tape at the transducer head. The time required for the tape to be brought up to constant running speed actually is reduced over the time required where the pinch roller is caused to rotate continuously at the speed of the capstan, even though the rate of acceleration is somewhat less.

One of the features of the invention is that when the actuator is de-energized to stop the tape drive, the pinch roller is quickly and positively brought to a stop by the braking surface of the stripper bar 54 by the action of the compression springs 50 and 52. The energy for producing the braking action is stored in the springs and thus the actuator need not supply a large force for disengaging the pinch roller. At the same time, the springs control the force between the pinch roller and the capstan during the tape drive operation to permit a controlled amount of slip between the tape and the capstan during tape acceleration. By adjusting the screws 57 to vary the tension of the two springs, the tape can be controlled in its lateral position as it passes over the capstan.

Because of the brake arrangement which brings the pinch roller to a stop almost instantaneously when the actuator is released, the pinch roller can be used to brake the movement of tape. By merely pulsing the actuator for a fixed short time interval, the tape can be halted in its movement in the opposite direction, as where two such capstans are used to drive the tape in either direction. In other words, where the tape is being driven at high speed in one direction, on release of the pinch roller, the actuator for imparting reverse movement of the tape can be pulsed only long enough to halt but not reverse the direction of movement of tape. This is only made possible because the brake on the pinch roller actuators insures that the pinch rollers are never spinning.

What is claimed is:

1. A capstan drive for magnetic tape comprising a rotatable capstan having a smooth cylindrical drive surface, a pinch roller having a cylindrical drive surface of an elastomer material, a mounting member for movably supporting the pinch roller, actuator means for moving the mounting member toward or away from the capstan, a hinge support for rotatably supporting the pinch roller from the mounting member while permitting the axis of rotation of the pinch roller to move relative to the mounting member, spring means connected between the hinge support and the mounting member for urging the pinch roller in a direction relative to said member to move the pinch roller toward the capstan, a stop member having a surface positioned to be engaged by the surface of the pinch roller under the urging of the spring means, the stop member being secured to and movable with the mounting member, the mounting member being moved by the actuator means sufficiently to engage the pinch roller with the capstan and disengage the stop member.

2. A capstan drive for magnetic tape comprising a rotatable capstan, a pinch roller having a cylindrical drive surface, a mounting member for movably supporting the pinch roller, actuator means for moving the mounting member toward the capstan, means for rotatably supporting the pinch roller from the mounting member while permitting the axis of rotation of the pinch roller to move relative to the mounting member, spring means connected between the supporting means and the mounting member for urging the pinch roller in a direction relative to said member to move the pinch roller toward the capstan, a stop member having a surface positioned to be engaged by the surface of the pinch roller under the urging of the spring means, the stop member being secured to and movable with the mounting member, the mounting member being moved by the actuator means sufficiently to engage the pinch roller with the capstan and disengage the stop member.

3. Apparatus for frictionally engaging and driving tape from a capstan drive comprising a pinch roller unit, means for supporting the unit in movable relationship to the capstan drive, actuator means for applying a force to the unit in a direction toward the capstan, the pinch roller unit including a mounting member having a portion defining a stop surface, a pinch roller, means for movably supporting the pinch roller from the mounting member, and spring means for normally urging the pinch roller in a direction toward the capstan and into engagement with the stop surface to prevent rotation of the pinch roller, the force of the actuator means being greater than the force exerted by the spring means, whereby the force of the actuator means in moving the pinch roller unit against the capstan is sufficient to overcome the force of the spring means and move the stop surface of the mounting member out of engagement with the pinch roller.

4. A tape drive assembly comprising a pair of parallel rollers between which the tape passes, means for supporting one of the rollers in relatively movable relationship, actuator means cooperating with the supporting means for forcing said one roller into rolling contact with the other roller spring means interposed between said one roller and the actuator means, and a stop member positioned to contact said one roller under the urging of the spring means, said one roller being moved out of contact with the stop means by the actuator means when the rollers are forced into contact.

5. Apparatus for driving magnetic tape, the tape having a smooth surface on one side and an oxide coated surface on the other side, said apparatus comprising a drive roller having a smooth hard cylindrical surface, a pinch roller having a soft yieldable cylindrical surface, the drive roller and the pinch roller being wider than the tape, means for moving the pinch roller and drive roller into rolling contact including a stop member normally engaging the pinch roller and spring means urging the pinch roller toward the drive roller and into contact with the stop member, the pinch roller moving means causing the stop member to move out of contact with the pinch roller against the urging of the spring means when the pinch roller is in contact with the drive roller.

References Cited in the file of this patent

UNITED STATES PATENTS

| | | |
|---|---|---|
| 2,704,138 | Gibson et al. | Mar. 15, 1955 |
| 2,990,092 | Begun et al. | June 27, 1961 |